United States Patent
Nishimura et al.

(10) Patent No.: US 11,855,483 B2
(45) Date of Patent: Dec. 26, 2023

(54) UNINTERRUPTIBLE POWER SUPPLY DEVICE

(71) Applicant: NISSIN ELECTRIC CO., LTD., Kyoto (JP)

(72) Inventors: Shoji Nishimura, Kyoto (JP); Yoshinori Kawasaki, Kyoto (JP); Satoshi Uda, Kyoto (JP)

(73) Assignee: NISSIN ELECTRIC CO., LTD., Kyoto (JP)

( * ) Notice: Subject to any disclaimer, the term of this patent is extended or adjusted under 35 U.S.C. 154(b) by 208 days.

(21) Appl. No.: 17/614,321

(22) PCT Filed: Jul. 1, 2019

(86) PCT No.: PCT/JP2019/026044
§ 371 (c)(1),
(2) Date: Nov. 24, 2021

(87) PCT Pub. No.: WO2021/001872
PCT Pub. Date: Jan. 7, 2021

(65) Prior Publication Data
US 2022/0231536 A1    Jul. 21, 2022

(51) Int. Cl.
*H02J 9/06* (2006.01)
*H02J 7/00* (2006.01)
(Continued)

(52) U.S. Cl.
CPC ............ *H02J 9/062* (2013.01); *H02H 7/18* (2013.01); *H02J 7/0029* (2013.01);
(Continued)

(58) Field of Classification Search
CPC ...... H02J 9/06; H02J 9/062; H02J 7/00; H02J 7/0029; H02J 7/0063; H02J 7/02; H02J 2207/20; H02H 7/18
See application file for complete search history.

(56) References Cited

U.S. PATENT DOCUMENTS

2004/0084965 A1    5/2004    Welches et al.

FOREIGN PATENT DOCUMENTS

| CN | 105429280 | 3/2016 |
|----|-----------|--------|
| CN | 106300646 | 6/2017 |

(Continued)

OTHER PUBLICATIONS

"International Search Report (Form PCT/ISA/210) of PCT/JP2019/026044," dated Jul. 30, 2019, with English translation thereof, pp. 1-2.

(Continued)

*Primary Examiner* — Robert L Deberadinis
(74) *Attorney, Agent, or Firm* — JCIPRNET

(57) ABSTRACT

An uninterruptible power supply device provided between a commercial power system and an essential load and supplying AC power to the essential load includes: a power supply part that has an energy storage device and is connected to a power line for supplying power from the commercial power system to the essential load; an open switch for opening/closing the power supply line, the open switch being provided on the power line on the commercial-power-system side of the power supply part; a system abnormality detection part for detecting a system abnormality occurring on the commercial-power-system side of the open switch; and a control part that, when the detected system abnormality is equal to or greater than the tolerance of the essential load or the power supply part against system abnormalities, opens the open switch and supplies AC power from the power supply part to the essential load.

7 Claims, 8 Drawing Sheets

(51) Int. Cl.
*H02H 7/18* (2006.01)
*H02J 7/02* (2016.01)

(52) U.S. Cl.
CPC .............. *H02J 7/0063* (2013.01); *H02J 7/02* (2013.01); *H02J 2207/20* (2020.01)

(56) References Cited

FOREIGN PATENT DOCUMENTS

| | | |
|---|---|---|
| JP | 2003219578 | 7/2003 |
| JP | 2005229662 | 8/2005 |
| JP | 2009177961 | 8/2009 |
| JP | 2009254102 | 10/2009 |
| JP | 2013009584 | 1/2013 |
| JP | 2017032452 | 2/2017 |
| JP | 2019047656 | 3/2019 |
| TW | 200841555 | 10/2008 |
| TW | 201614929 | 4/2016 |
| WO | 2019007691 | 1/2019 |

OTHER PUBLICATIONS

Office Action of Taiwan Counterpart Application, with English translation thereof, dated Jan. 7, 2020, pp. 1-11.
Office Action of Taiwan Counterpart Application, with English translation thereof, dated Sep. 3, 2020, pp. 1-8.
"Office Action of India Counterpart Application", dated Jul. 15, 2022, p. 1-p. 5.
"Search Report of Europe Counterpart Application", dated Jan. 9, 2023, p. 1-p. 7.
"Office Action of China Counterpart Application", dated Jul. 30, 2023, with English translation thereof, p. 1-p. 14.

| No. | Condition for system abnormality tolerance of essential load and power supply part | Opening or closing of switch | Operation of power supply part |
|---|---|---|---|
| (1) | System abnormality < tolerance for system abnormality | Closed | Track system abnormality and continue operation as it is. |
| (2) | Tolerance for system abnormality < system abnormality | Opened | Operation continues within range of tolerance limit of one of essential load and power supply part that has smaller system abnormality tolerance (autonomous operation). |

FIG. 2

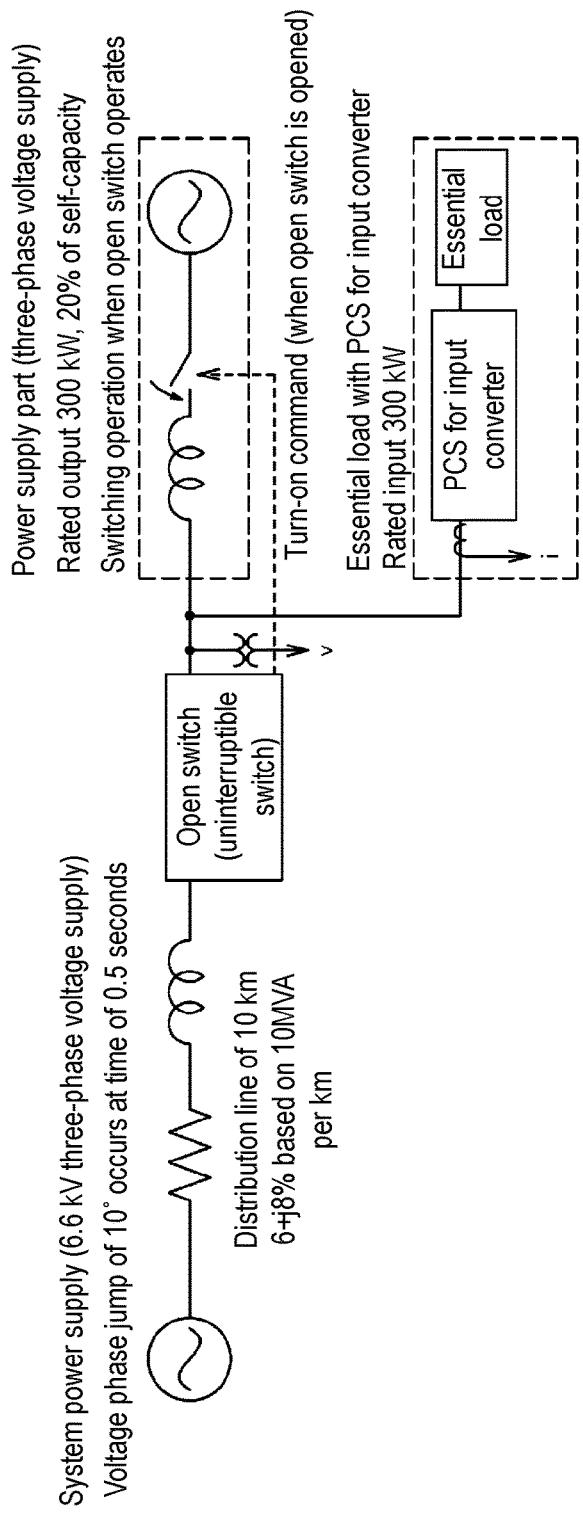
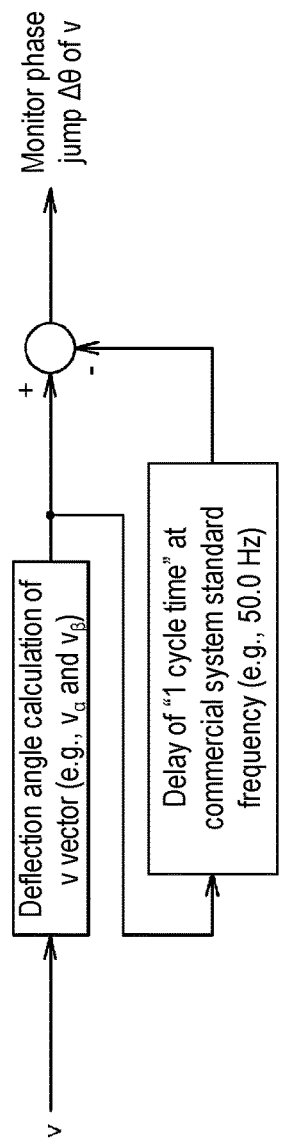
FIG. 3

| No. | Condition for system abnormality tolerance of essential load and power supply part | Opening or closing of switch | Operation of power supply part |
|---|---|---|---|
| (1) | System abnormality < threshold value | Closed | Track system abnormality and continue operation as it is. |
| (2) | Threshold value < system abnormality | Closed | Compensation operation for system abnormality (change reduction operation on abnormal element) |
| (3) | Tolerance for system abnormality < system abnormality | Opened | Operation continues within range of tolerance limit of one of essential load and power supply part that has smaller system abnormality tolerance (autonomous operation). |

FIG. 7

UNINTERRUPTIBLE POWER SUPPLY DEVICE

CROSS-REFERENCE TO RELATED APPLICATION

This application is a 371 application of the International PCT application serial no. PCT/JP2019/026044, filed on Jul. 1, 2019. The entirety of each of the above-mentioned patent application is hereby incorporated by reference herein and made a part of this specification.

TECHNICAL FIELD

The disclosure relates to an uninterruptible power supply device of a continuous commercial power supply type.

RELATED ART

An uninterruptible power supply device of the continuous commercial power supply type compensates for an instantaneous voltage drop or a frequency fluctuation of a system voltage of a commercial power system and is configured, for example, as disclosed in Patent Document 1, in a manner that a power supply part including a storage battery and a parallel inverter is connected to a load in parallel and a switch is provided at a level above them. When a system voltage of the commercial power system deviates from a predetermined allowed voltage range, the switch is opened and power is supplied from a power storage part (i.e., an energy storage device) to the load.

However, the conventional uninterruptible power supply device of the continuous commercial power supply type performs only a compensation operation of an instantaneous voltage drop and a frequency fluctuation for the load, and may not perform a compensation operation for other system abnormalities. Further, the system abnormality is taken into consideration only for the load and is not taken into consideration for the energy storage device.

RELATED ART DOCUMENT(S)

Patent Document(s)

Patent Document 1: Japanese Patent Application Laid-Open No. 2005-229662

SUMMARY OF INVENTION

Problems to be Solved

Therefore, the disclosure has been made to solve the above problems, and its main objective is to provide an uninterruptible power supply device capable of responding to various system abnormalities other than a voltage drop including an instantaneous voltage drop and a frequency fluctuation.

Means for Solving the Problems

Namely, an uninterruptible power supply device according to the disclosure is an uninterruptible power supply device provided between a commercial power system and an essential load and supplies AC power to the essential load. The uninterruptible power supply device includes a power supply part, an open switch, a system abnormality detection part, and a control part. The power supply part has an energy storage device connected to a power line for supplying power from the power system to the essential load. The open switch is provided on a commercial power system side of the power supply part on the power line to open and close the power line. The system abnormality detection part detects a system abnormality which is at least one of a voltage rise, a phase fluctuation, a voltage imbalance, a harmonic abnormality, and a flicker in addition to at least one of a voltage drop including an instantaneous voltage drop and a frequency fluctuation, occurring on the commercial power system side of the open switch. The control part opens the open switch to supply AC power from the power supply part to the essential load when a detected system abnormality is equal to or greater than a tolerance of the essential load or the power supply part for the system abnormality.

In the case of such an uninterruptible power supply device, in addition to at least one of a voltage drop including an instantaneous voltage drop and a frequency fluctuation, the system abnormality detection part detects a system abnormality which is at least one of a voltage rise, a phase fluctuation, a voltage imbalance, a harmonic abnormality, and a flicker. Since the open switch is opened when the detected system abnormality is equal to or greater than the tolerance of the essential load or the power supply part for the system abnormality, it is possible to also respond to various system abnormalities other than a voltage drop including an instantaneous voltage drop and a frequency fluctuation. Further, since not only the tolerance of the essential load for the system abnormality but also the tolerance of the power supply part for the system abnormality is taken as a parameter for opening the open switch, it is possible to respond to a system abnormality in consideration of not only the essential load but also the power supply part.

Herein, although consideration of the phase fluctuation, the voltage imbalance, the harmonic abnormality, or the flicker as a system abnormality element may be read from the interconnection pattern, it is further expressed by Math. 1 when an α component (which is a real-number component) and a β component (which is an imaginary-number component) are expressed in a complex number obtained by a three phase-two phase conversion (α-β-0 conversion) of a three-phase system voltage.

$$v = V_1 \cdot e^{j(2\pi f \cdot t + \theta)} + \sum_{n \neq 1} v_n \qquad [\text{Math. 1}]$$

Herein, each element is as follows:
v: a system voltage;
$V_1$: a system voltage amplitude;
f: a system voltage frequency;
θ: a system voltage phase; a phase fluctuation of a phase jump is a change in this element;
$\Sigma_{n \neq 1} v_n$: a component other than a positive phase of a fundamental wave; there are a negative phase component of n=−1 and a harmonic component of |n|≠1; and a flicker is a low-periodic fluctuation of a few to tens of Hz of $V_1$.

As a result obtained by adding system abnormality elements according to this consideration, as in an uninterruptible power supply device of a continuous inverter power supply type which is more expensive, the uninterruptible power supply device of the continuous commercial power supply type can respond to system abnormality elements such as a voltage rise, a phase fluctuation, a voltage imbalance, a harmonic abnormality, and a flicker in addition to a voltage drop including an instantaneous voltage drop and a frequency fluctuation. As an example, as disclosed in <Simulation of first embodiment> to be described below, it is possible to prevent an abnormality (in this simulation, dropping due to an overcurrent abnormality of an essential load with an interconnection inverter) of the uninterruptible power supply device beforehand.

As a specific embodiment, with the open switch being opened, the power supply part may perform autonomous operation within a range of a tolerance limit of one of the essential load and the power supply part that has a smaller tolerance for the system abnormality.

In order to reduce the frequency of transition to autonomous operation with high running cost, the control part may cause the power supply part to perform a compensation operation for the system abnormality when the system abnormality detected by the system abnormality detection part is equal to or greater than a predetermined threshold value at which a degree of abnormality is less than the tolerance of the essential load or the power supply part for the system abnormality.

In order to respond to an extended autonomous operation time, a power generation device connected to the power line may be provided separately from the power supply part.

Effects of Invention

According to the disclosure configured in this manner, it is possible to provide an uninterruptible power supply device capable of responding to various system abnormalities other than a voltage drop including an instantaneous voltage drop and a frequency fluctuation.

BRIEF DESCRIPTION OF THE DRAWINGS

FIG. 2 is a table showing a list of operation states in a system abnormality of the first embodiment.

FIG. 3 is a view showing a simulation model of a compensation operation at the time of a phase jump.

FIG. 7 is a table showing a list of operation states in a system abnormality of the second embodiment.

DESCRIPTION OF THE EMBODIMENTS

First Embodiment

Hereinafter, a first embodiment of an uninterruptible power supply device according to the disclosure will be described with reference to the drawings.

Figure 1:
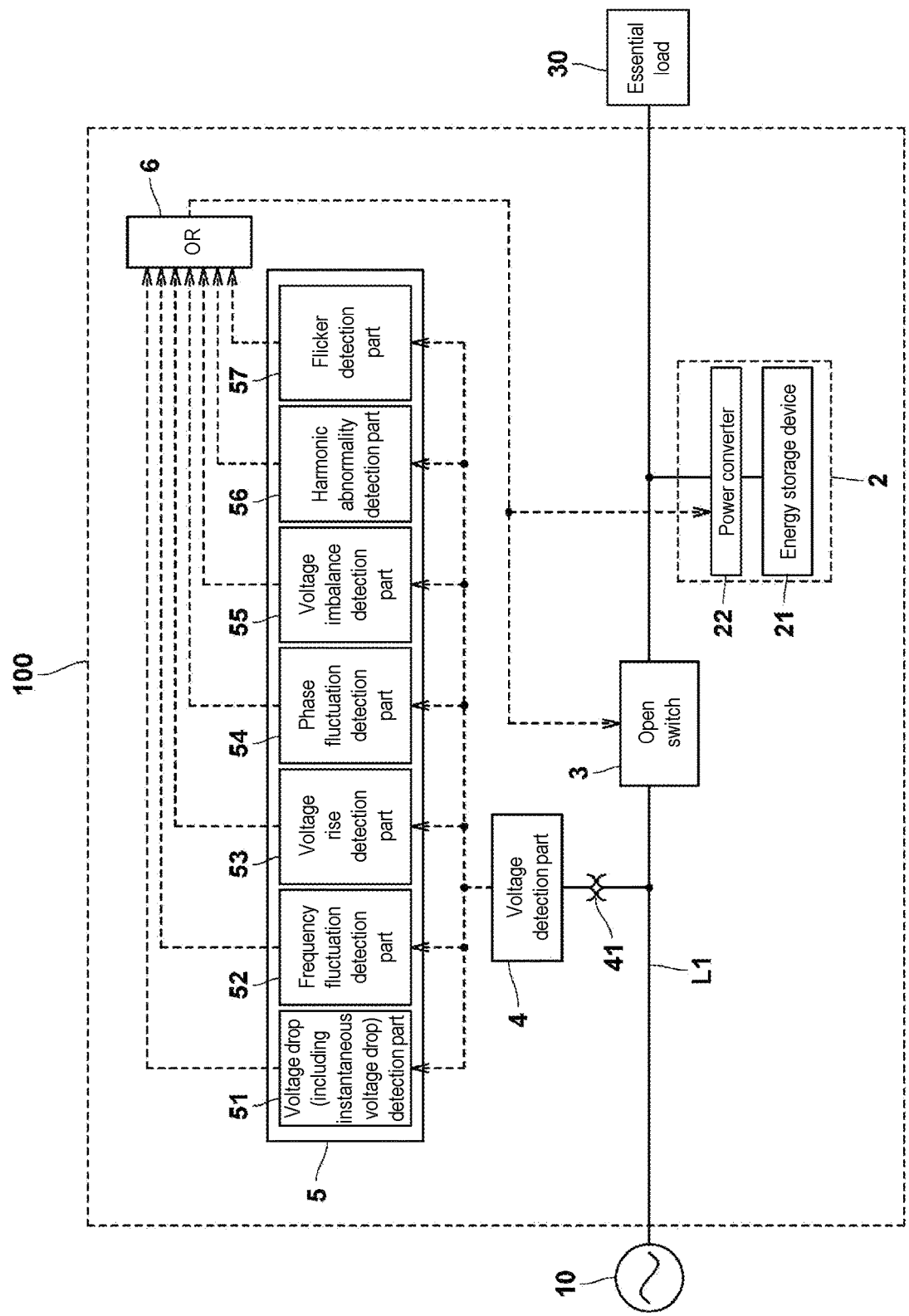
FIG. 1 is a schematic view showing a configuration of an uninterruptible power supply device according to a first embodiment.

As shown in FIG. 1, an uninterruptible power supply device 100 of the first embodiment is provided between a commercial power system 10 and an essential load 30, and is a continuous commercial power supply system that supplies power to the essential load 30 when the commercial power system 10 is abnormal. The uninterruptible power supply device 100 may also be provided between the essential load 30 and an upper power supply-side power system on a self-employed line in addition to the commercial power system 10.

Herein, the commercial power system 10 is a power supply network of an electric power company (electric utility), and has a power plant, a power transmission system, and a power distribution system. Further, the essential load 30 is a load that should be stably supplied with electric power even during a system abnormality such as a power failure or an instantaneous voltage drop, and the number of the essential load is one in FIG. 1 but may also be plural.

Specifically, the uninterruptible power supply device 100 includes a power supply part 2, an open switch 3 which connects the commercial power system 10, the power supply part 2, and the essential load 30, a system-side voltage detection part 4 which detects a voltage on the commercial power system 10 side of the open switch 3, a system abnormality detection part 5 which detects a system abnormality from the detection voltage of the system-side voltage detection part 4, and a control part 6 which opens the open switch 3 according to a detection signal of the system abnormality detection part 5.

The power supply part 2 is connected to a power line L1 for supplying power from the commercial power system 10 to the essential load 30. The power supply part 2 is interconnected with the commercial power system 10, and has an energy storage device 21 such as a secondary battery (storage battery) and a power converter (power conditioner) 22.

The open switch 3 is provided on the commercial power system 10 side of a connection point of the power supply part 2 on the power line L1 to open and close the power line L1, and for example, an uninterruptible switch capable of high-speed switching such as a semiconductor switch or a hybrid switch combining a semiconductor switch and a mechanical switch may be used. For example, when a semiconductor switch is used, the switching time may be set to 2 milliseconds or less, and the switch may be cut off regardless of the zero point. Further, when a hybrid switch is used, the switching time may be set to 2 milliseconds or less, and not only can the switch be cut off regardless of the zero point, but also the conduction loss may be zero. The opening/closing of the open switch 3 is controlled by the control part 6.

The system-side voltage detection part 4 detects the voltage on the commercial power system 10 side of the open switch 3 on the power line L1 via an instrument transformer 41. Specifically, the system-side voltage detection part 4 is connected to the commercial power system 10 side of the open switch 3 via the instrument transformer 41.

The system abnormality detection part 5 detects each system abnormality on the commercial power system 10 side of the open switch 3 from the detection voltage detected by the system-side voltage detection part 4. The system abnormality of this embodiment is a voltage drop including an instantaneous voltage drop, a voltage rise, a frequency fluctuation, a phase fluctuation, a voltage imbalance, an abnormal harmonic, and a flicker.

Therefore, the system abnormality detection part 5 has a voltage drop detection part 51 which detects a voltage drop including an instantaneous voltage drop, a frequency fluctuation detection part 52 which detects a frequency fluctuation, a voltage rise detection part 53 which detects a voltage rise, a phase fluctuation detection part 54 which detects a phase fluctuation, a voltage imbalance detection part 55 which detects a voltage imbalance, a harmonic abnormality detection part 56 which detects an abnormal harmonic, and a flicker detection part 57 which detects a flicker.

The voltage drop detection part 51 detects a voltage drop by comparing the detection voltage of the system-side voltage detection part 4 with a predetermined set value. Herein, the set value for detecting the voltage drop is a voltage value for detecting an instantaneous voltage drop, and is, for example, a residual voltage of 20%.

The frequency fluctuation detection part 52 detects a frequency fluctuation (frequency increase (OF), frequency decrease (UF)) from the detection voltage of the system-side voltage detection part 4. The frequency fluctuation is, for example, a stepwise rise or a ramp-like rise/fall.

The voltage rise detection part 53 detects a voltage rise by comparing the detection voltage of the system-side voltage detection part 4 with a predetermined set value. Herein, the set value for detecting the voltage rise is, for example, 107% of the system voltage.

The phase fluctuation detection part 54 detects a phase fluctuation such as a phase jump of 10° from the phase of the detection voltage of the system-side voltage detection part 4.

The voltage imbalance detection part 55 detects a magnitude of the amplitude or a phase difference of 120° among the three phases that becomes a different state from the detection voltage of the system-side voltage detection part 4.

The harmonic abnormality detection part 56 detects a harmonic voltage from the detection voltage of the system-side voltage detection part 4. The flicker detection part 57 detects a voltage fluctuation (flicker) from the detection voltage of the system-side voltage detection part 4.

Based on each detection signal detected by the system abnormality detection part 5, the control part 6 outputs a control signal to the open switch 3 to open the open switch 3. The control part 6 of this embodiment receives the detection signals from the detection parts 51 to 57, and opens the open switch 3 when any one of the detection signals satisfies a predetermined condition (OR condition).

Specifically, the control part 6 opens the open switch 3 when at least one of the system abnormalities detected by the detection parts 51 to 57 is equal to or greater than a tolerance of the essential load 30 or the power supply part 2 for the system abnormality.

The operation of the power supply part 2 together with the specific opening/closing control on the open switch 3 by the control part 6 will be described with reference to FIG. 2.

Normally, the uninterruptible power supply device 100 closes the open switch 3, and the power supply part 2 and the essential load 30 are connected to commercial power system 10 via the open switch 3.

(1) When each detected system abnormality is less than a smaller system abnormality tolerance between the system abnormality tolerances of the power supply part 2 and the essential load 30 ((1) of FIG. 2), the control part 6 maintains the state in which the open switch 3 is turned on. At this time, the power supply part 2 tracks the system abnormality of the commercial power system 10 and continues operating.

(2) When the detected system abnormality is equal to or greater than the smaller system abnormality tolerance between the system abnormality tolerances of the power supply part 2 and the essential load 30 ((2) of FIG. 2), the control part 6 opens the open switch 3. In this state, the power supply part 2 continues operating within the range of the tolerance limit of one of the essential load 30 and the power supply part 2 that has the smaller system abnormality tolerance (autonomous operation of the power supply part 2).

Each of the detection parts 51 to 57 detects each system abnormality of the commercial power system 10 regardless of the opening and closing of the open switch 3, and the control part 6 closes the open switch 3 when each system abnormality of the commercial power system 10 becomes less than the above smaller system abnormality tolerance.

Simulation of First Embodiment

The effect on the power supply part when a phase jump (phase jump of 10°) occurs in the commercial power system has been simulated as an example of the system abnormality. FIG. 3 shows a system model of this simulation and a monitoring control model of a phase jump Δθ of a voltage v at a switch output point.

Figure 4:
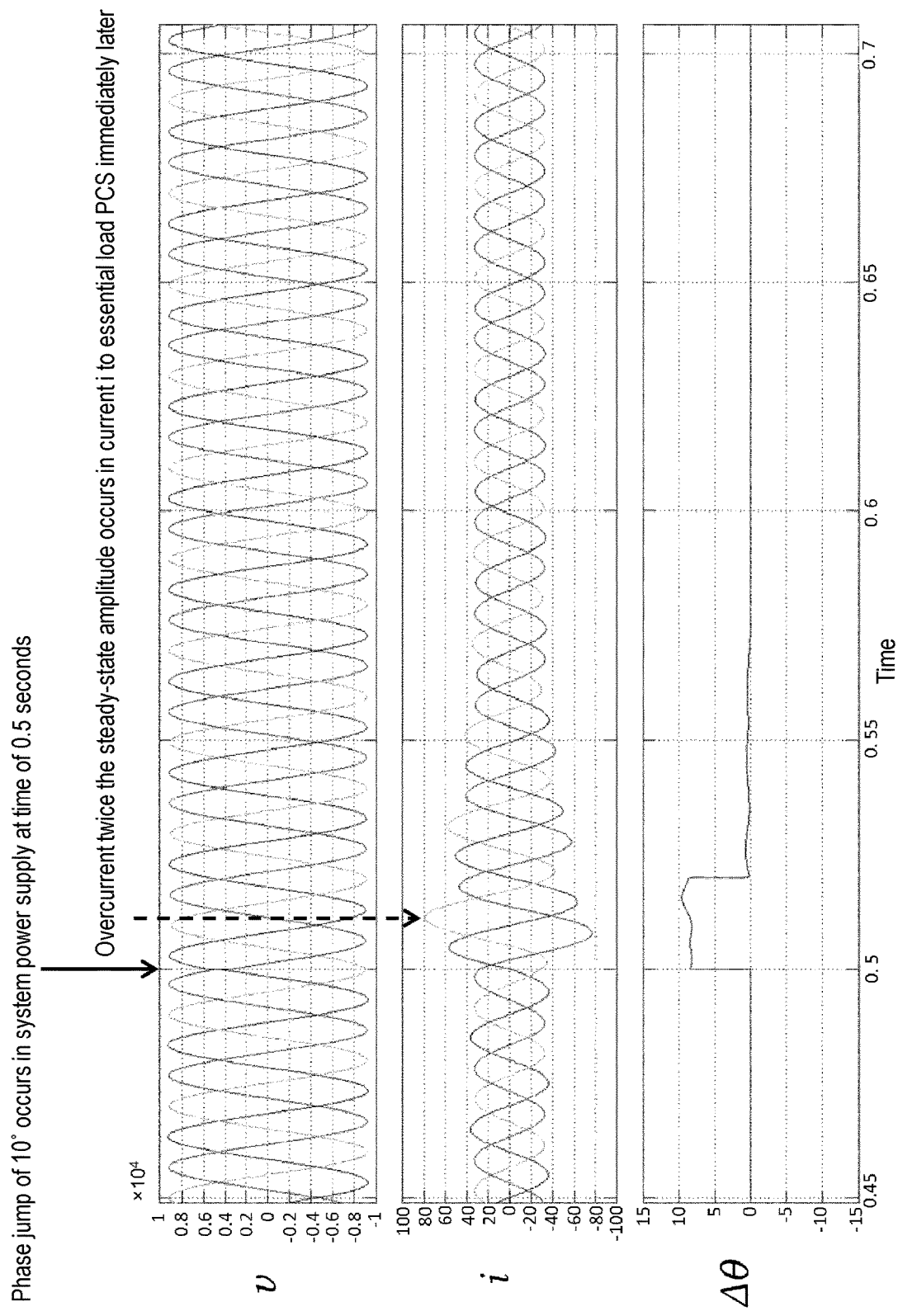
FIG. 4 is a diagram showing a simulation result when the open switch is not operated.

FIG. 4 shows a voltage v, a current i, and a phase jump Δθ at the switch output point when the open switch is not operated. A phase jump of 10° occurs in the commercial power system at the time of 0.5 seconds, and immediately afterwards, an overcurrent twice the steady-state amplitude occurs in the current i to a PCS of the essential load.

Figure 5:
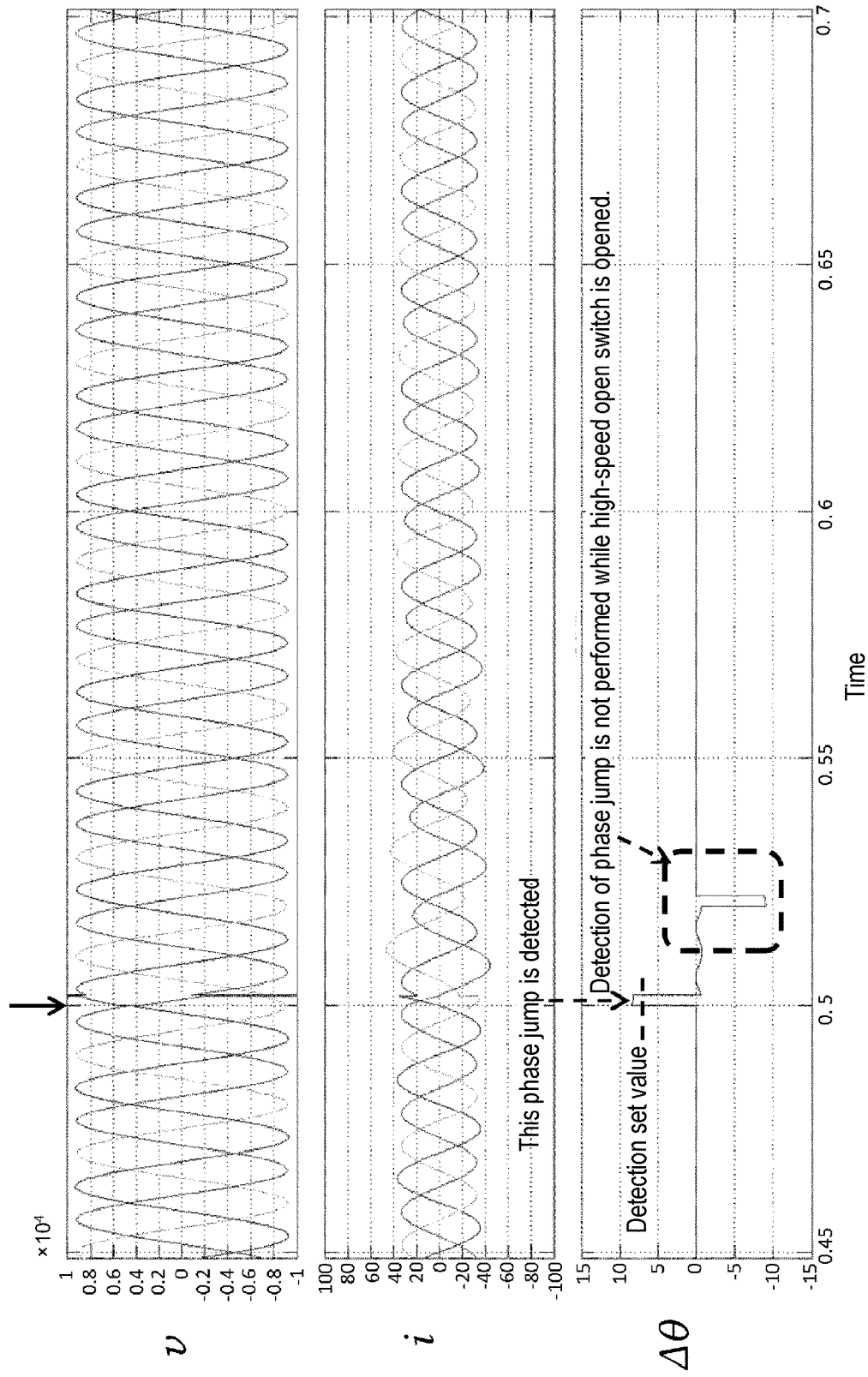
FIG. 5 is a diagram showing a simulation result when the open switch is operated.

FIG. 5 shows a voltage v, a current i, and a phase jump Δθ at the switch output point when the open switch is operated. A phase jump of 10° occurs in the commercial power system at the time of 0.5 seconds, and the open switch is opened after 2 milliseconds by this phase jump detection. While the switch is opened, control is performed such that phase jump detection is not performed.

According to the above simulation result, it is learned that the voltage fluctuation at the time of occurrence of the phase jump is about 10% of the voltage amplitude, and an overcurrent occurs. In such a case, if the phase jump is monitored and the open switch is opened before a large phase jump, it is possible to prevent the essential load from opening (dropping) due to an overcurrent when the overcurrent tolerance of the PCS (inverter) of the essential load is twice or less (conversely, the essential load may drop due to an overcurrent if this countermeasure is not taken). According to this simulation result, it is learned that phase jump detection is effective, and the system abnormality cannot be dealt with simply by the detection function of a voltage drop including an instantaneous voltage drop.

Effect of First Embodiment

According to the uninterruptible power supply device 100 of the first embodiment configured in this manner, in addition to at least one of a voltage drop including an instantaneous voltage drop and a frequency fluctuation, the system abnormality detection part detects a system abnormality which is at least one of a voltage rise, a phase fluctuation, a voltage imbalance, a harmonic abnormality, and a flicker. Since the open switch 3 is opened when the detected system abnormality is equal to or greater than the tolerance of the essential load 30 or the power supply part 2 for the system abnormality, it is possible to also respond to various system abnormalities other than a voltage drop including an instantaneous voltage drop and a frequency fluctuation. Further, since not only the tolerance of the essential load for the system abnormality but also the tolerance of the power supply part 2 for the system abnormality is taken as a parameter for opening the open switch 3, it is possible to respond to a system abnormality in consideration of not only the essential load 30 but also the power supply part 2.

Second Embodiment

Next, a second embodiment of the uninterruptible power supply device according to the disclosure will be described.

Figure 6:
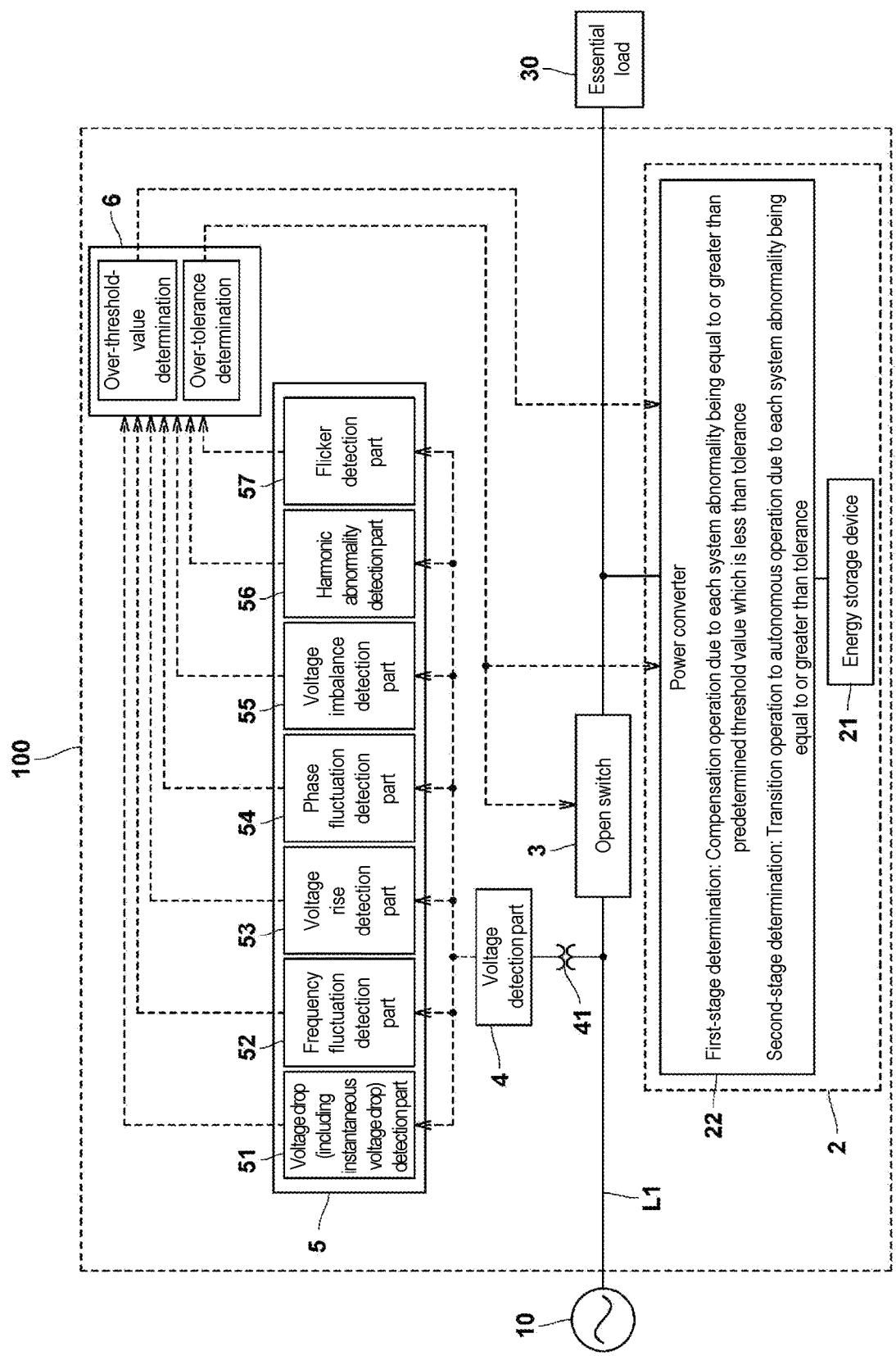
FIG. 6 is a schematic view showing a configuration of an uninterruptible power supply device according to a second embodiment.

As shown in FIG. 6, the uninterruptible power supply device of the second embodiment is different from the above embodiment in the configuration of the control part 6 and the operation of the power supply part 2.

In other words, in addition to the above embodiment, when at least one of system abnormalities detected by each of the detection parts 51 to 57 is equal to or greater than a predetermined threshold value which is less than the system abnormality tolerance of the essential load 30 or the power supply part 2, the control part 6 of the second embodiment causes the power supply part 2 to perform a compensation operation for each system abnormality without opening the open switch 3.

The operation of the power supply part 2 together with the specific opening/closing control on the open switch 3 by the control part 6 will be described with reference to FIG. 7.

Normally, the uninterruptible power supply device 100 closes the open switch 3, and the power supply part 2 and the essential load 30 are connected to the commercial power system 10 via the open switch 3.

(1) When the detected system abnormality is less than the predetermined threshold value ((1) of FIG. 7), the control part 6 maintains the state in which the open switch 3 is turned on. At this time, the power supply part 2 tracks the system abnormality of the commercial power system 10 and continues operating.

(2) When the detected system abnormality is equal to or greater than the predetermined threshold value ((2) of FIG. 7), the control part 6 maintains the state in which the open switch 3 is turned on. At this time, the power supply part 2 performs a compensation operation (change reduction operation on the system abnormality) for the system abnormality of the commercial power system. In this case, it is assumed that the detected system abnormality is less than the system abnormality tolerances of the power supply part 2 and the essential load 30.

(3) When the detected system abnormality is equal to or greater than a smaller system abnormality tolerance between the system abnormality tolerances of the power supply part 2 and the essential load 30 ((3) of FIG. 7), the control part 6 opens the open switch 3. In this state, the power supply part 2 continues operating within the range of the tolerance limit of one of the essential load 30 and the power supply part 2 that has the smaller system abnormality tolerance (autonomous operation).

Effect of Second Embodiment

According to the uninterruptible power supply device 100 of the second embodiment configured in this manner, in addition to the effect of the first embodiment, it is possible to reduce the frequency of transition to autonomous operation with high running cost.

Other Modified Embodiments

The disclosure is not limited to the above embodiments.

Figure 8:
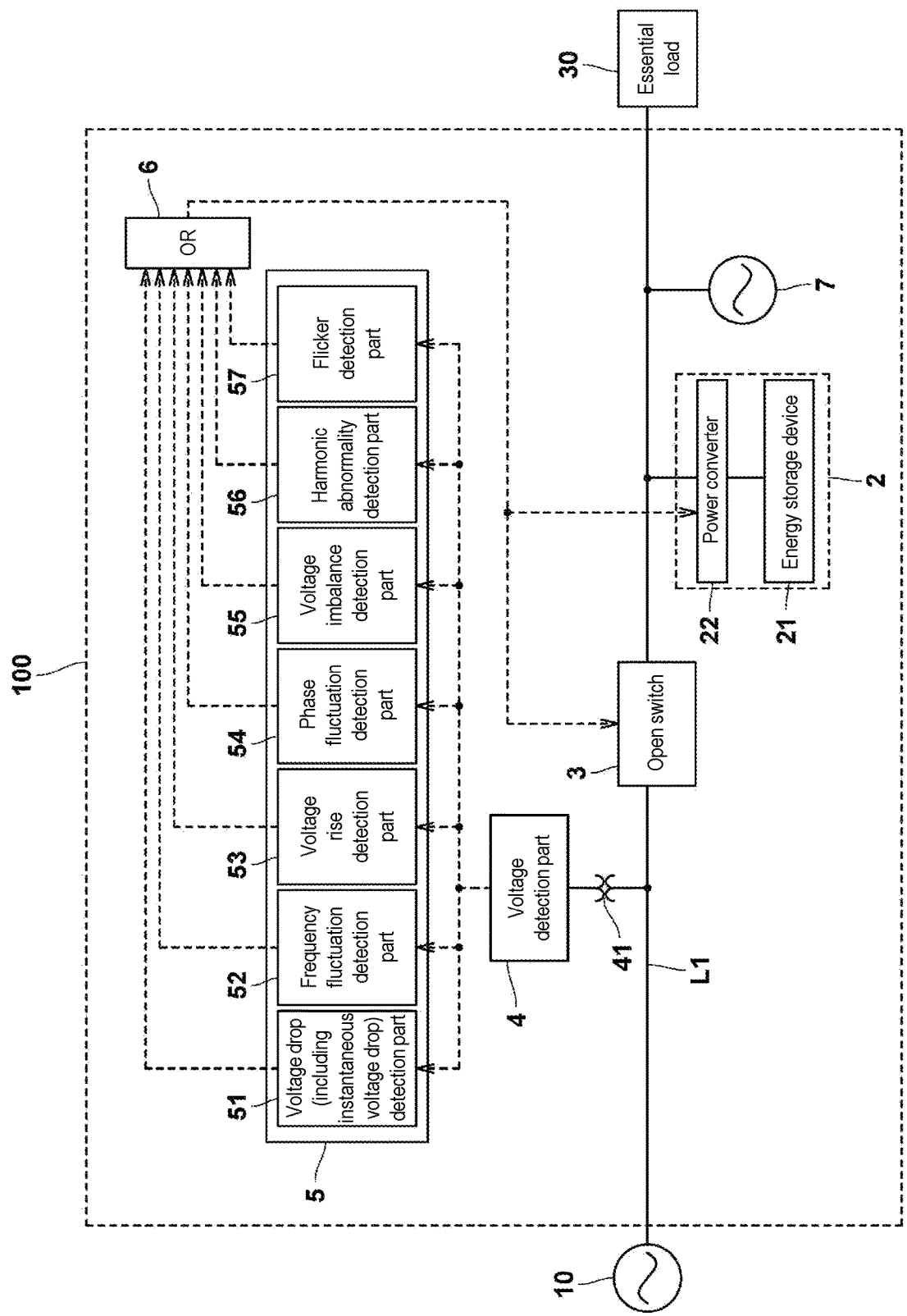
FIG. 8 is a schematic view showing a configuration of an uninterruptible power supply device of another modified embodiment.

For example, as shown in FIG. 8, a power generation device (generator) 7 connected to the power line L1 may be provided separately from the power supply part 2. The power generation device 7 is connected to the essential load 30 side of the open switch 3. With this configuration, it is possible to respond to an extended autonomous operation time (at the time of a system power failure).

Further, in each of the above embodiments, the open switch 3 is opened when any one of the system abnormalities satisfies the condition. However, the open switch 3 may also be opened when a combination of two or more system abnormalities satisfies the predetermined condition.

Further, although the energy storage device of the above embodiment is a storage battery such as a secondary battery, it may also be of a pumped-storage power generation type, a compressed-air storage type, a superconducting power storage type, a flywheel, an electric double-layer capacitor, or the like.

In addition, obviously, the disclosure is not limited to the above embodiments, and various modifications may be made without departing from the spirit of the disclosure.

INDUSTRIAL APPLICABILITY

According to the disclosure, it is possible to provide an uninterruptible power supply device capable of responding to various system abnormalities other than a voltage drop including an instantaneous voltage drop and a frequency fluctuation.

What is claimed is:

1. An uninterruptible power supply device, which is an uninterruptible power supply device provided between an essential load and a power system on an upper power supply side on a commercial or self-employed line and supplies AC power to the essential load, the uninterruptible power supply device comprising:
    a power supply part having an energy storage device connected to a power line for supplying power from the power system to the essential load;
    an open switch provided on a power system side of the power supply part on the power line to open and close the power line;
    a system abnormality detection part detecting a system abnormality which is at least one of a voltage rise, a phase fluctuation, a voltage imbalance, a harmonic abnormality, and a flicker in addition to at least one of a voltage drop including an instantaneous voltage drop and a frequency fluctuation, occurring on the power system side of the open switch; and
    a control part opening the open switch to supply AC power from the power supply part to the essential load when a detected system abnormality is equal to or greater than a tolerance of the essential load or the power supply part for the system abnormality.

2. The uninterruptible power supply device according to claim 1, wherein with the open switch being opened, the power supply part performs autonomous operation within a range of a tolerance limit of one of the essential load and the power supply part that has a smaller tolerance for the system abnormality.

3. The uninterruptible power supply device according to claim 1, wherein the control part causes the power supply part to perform a compensation operation for the system abnormality when the system abnormality detected by the system abnormality detection part is equal to or greater than a threshold value at which a degree of abnormality is less than the tolerance of the essential load or the power supply part for the system abnormality.

4. The uninterruptible power supply device according to claim 1, further comprising a power generation device connected to the power line separately from the power supply part.

5. The uninterruptible power supply device according to claim 2, wherein the control part causes the power supply part to perform a compensation operation for the system abnormality when the system abnormality detected by the system abnormality detection part is equal to or greater than a threshold value at which a degree of abnormality is less than the tolerance of the essential load or the power supply part for the system abnormality.

6. The uninterruptible power supply device according to claim 2, further comprising a power generation device connected to the power line separately from the power supply part.

7. The uninterruptible power supply device according to claim 3, further comprising a power generation device connected to the power line separately from the power supply part.

* * * * *